United States Patent
Wolf et al.

(10) Patent No.: US 6,242,827 B1
(45) Date of Patent: Jun. 5, 2001

(54) PORTABLE COMMUNICATION DEVICE WITH ELECTROMECHANICAL TRANSDUCER MEANS AND A BATTERY PACK THEREFOR

(75) Inventors: Mats Wolf, Södra Sandby; Per Svensson, Lund, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/323,938

(22) Filed: Jun. 2, 1999

(30) Foreign Application Priority Data

Jun. 2, 1998 (SE) ..................................... 9801943

(51) Int. Cl.[7] ............................. H02K 7/00; H02K 7/075
(52) U.S. Cl. ............................. 310/74; 320/114
(58) Field of Search ...................... 310/74, 80; 429/90; 320/112, 114

(56) References Cited

U.S. PATENT DOCUMENTS 4,644,246 * 2/1987 Knapen .................................. 320/21
5,363,445   11/1994 Shyu .................................... 379/433
5,796,240 *  8/1998 Saito et al. ............................. 322/10
5,905,359 *  5/1999 Jimena .................................. 320/114
5,923,619 *  7/1999 Knapen et al. ......................... 368/64

FOREIGN PATENT DOCUMENTS

| 3211114 | 6/1983 | (DE) . |
| 0208375 | 2/1986 | (EP) . |
| 409819 | 1/1991 | (EP) . |
| 2079913 | 12/1971 | (FR) . |
| 2307143 | 5/1997 | (GB) . |
| 5173974 | 7/1993 | (JP) . |
| 0801466 | 6/1994 | (JP) . |
| 95/02270 | 1/1995 | (WO) . |

* cited by examiner

*Primary Examiner*—Karl Tamai
(74) *Attorney, Agent, or Firm*—Burns, Doane, Swecker & Mathis, L.L.P.

(57) ABSTRACT

A portable communication device has an electromechanical transducer for converting mechanical energy, caused by movements of the portable communication device, into electrical energy for supplying power to the portable communication device. The electromechanical transducer is arranged to store mechanical energy after a respective movement of the portable communication device ceases.

8 Claims, 3 Drawing Sheets

PORTABLE COMMUNICATION DEVICE WITH ELECTROMECHANICAL TRANSDUCER MEANS AND A BATTERY PACK THEREFOR

TECHNICAL FIELD

The present invention relates to a portable communication device, comprising electromechanical transducer means for converting mechanical energy, caused by movements of the portable communication device, into electrical energy for supplying power to the portable communication device. The invention also relates to a battery pack for a portable communication device, wherein the battery pack comprises electromechanical transducer means of the afore-said type.

BACKGROUND

Portable communications devices, such as mobile telephones, personal digital assistants (PDA) handheld communicators, etc, are often provided with a rechargeable battery pack for supplying electrical power to the device during the operation thereof. Even if rechargable battery packs have become increasingly efficient, they inevitably run out of power sooner or later and therefore have to be recharged repeatedly. In a worst case scenario the battery pack runs out of electrical power just before the user of the communication device is about to make an important telephone call, such as an emergency call ("112" in Europe, "911" in the USA). If this undesired situation occurs, the user is unable to make the important call immediately and has to find an operative telephone elsewhere or, alternatively, detach the empty battery pack and replace it with another battery pack with a sufficient level of charge.

Various solutions have been proposed for enhancing the operability of portable communication devices and allowing instant use also when the primary power source (e.g. the battery) is inoperative. For instance, in EP-A-0 409 819 it is suggested to provide a mobile telephone with an electrical dynamo driven by means of a toothed rod, which is actuated via a movable operating lever protruding from the mobile telephone housing. Another way of inputting mechanical energy and converting it to electrical power in a mobile telephone is shown in GB-A-2 307 143, wherein a rotary knob is used to wind a spring, which drives a rotary electrical generator. Furthermore, U.S. Pat. No. 5,363,445 relates to an auxiliary charging device for a mobile telephone, comprising a coil, a magnet, a revolving disc, a set of gears and an operating handle. The operating handle is manually pushed inward to rotate the gears, the revolving disc as well as the magnet to cause the coil to produce electrical current to be supplied to the mobile telephone, when the battery thereof has been consumed.

A similar mechanical power supply for mobile telephones is known from DE-A-32 11 114, a first embodiment of which comprises a crank-and-gear arrangement and a second embodiment of which is using a spring. FR-2 079 913 relates to a power supply for a portable transceiver, wherein a crank is used for driving an electrical generator. JP-A-08018466 discloses a portable radio for emergency use. The radio comprises an electrical dynamo and a permanent magnet arranged to be movable in a longitudinal direction inside the radio housing. By exerting the radio to a reciprocating movement (for instance by shaking the radio) the permanent magnet is subjected to a reciprocating movement inside the dynamo, wherein electrical current is generated for driving the radio without any electrical battery.

The above prior art solutions are all able to allow operation of the portable communication device without any need for an operative electrical battery. However, all solutions have a common drawback in that they are dependent on user-initiated actuation. In order to generate the required amount of electrical energy the user has to pull a handle, rotate a knob, shake the radio, etc.

SUMMARY

The object of the present invention is to enhance the operability of a portable communication device provided with electromechanical transducer means converting mechanical energy, caused by movements of the portable communication device, into electrical energy for supplying power to the portable communication device.

The object is achieved by arranging said electromechanical transducer means so that it stores mechanical energy also after a respective movement of the device has ceased.

Other objects, advantages and features of the present invention appear from the following detailed disclosure, from the drawings as well as from the appended patent claims.

BRIEF DESCRIPTION OF THE DRAWING

The present invention will now be described in more detail, reference being made to the accompanying drawings, in which.

DESCRIPTION

Figure 1:
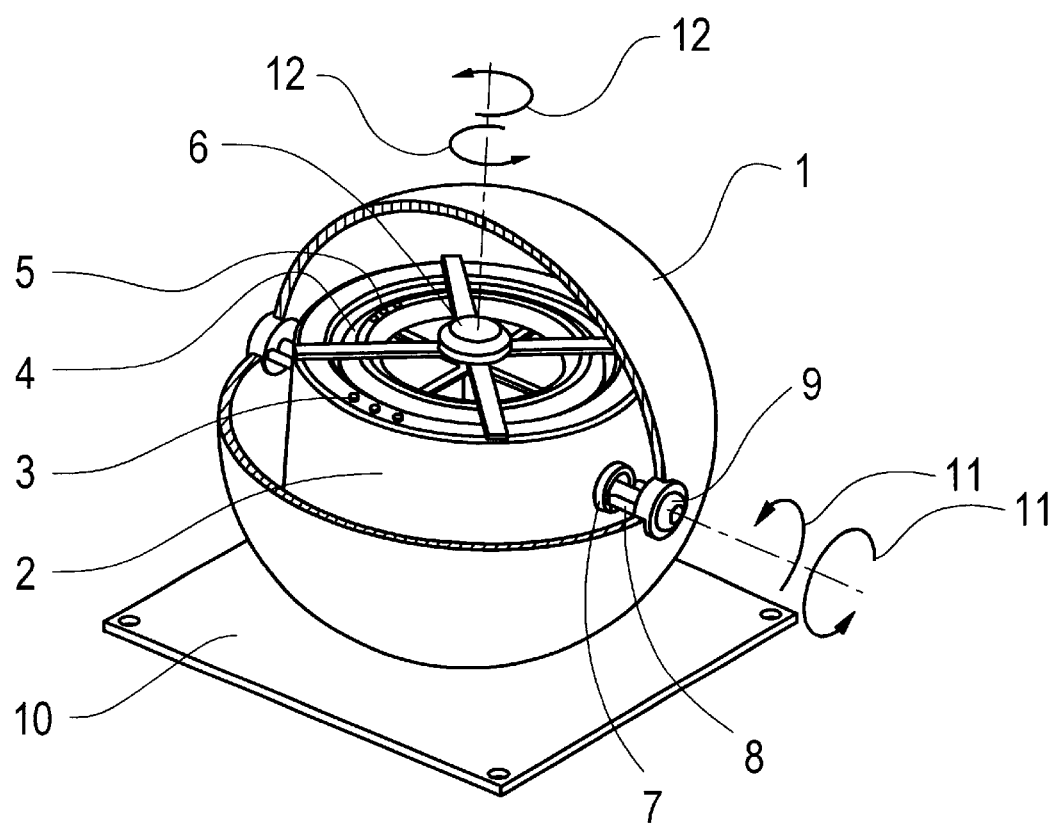
FIG. 1 is a schematical and partly fractioned perspective view of an electromechanical transducer means according to an exemplary embodiment of the present invention and FIG. 2 is a schematical plan view of the embodiment of FIG. 1.
Figure 2:
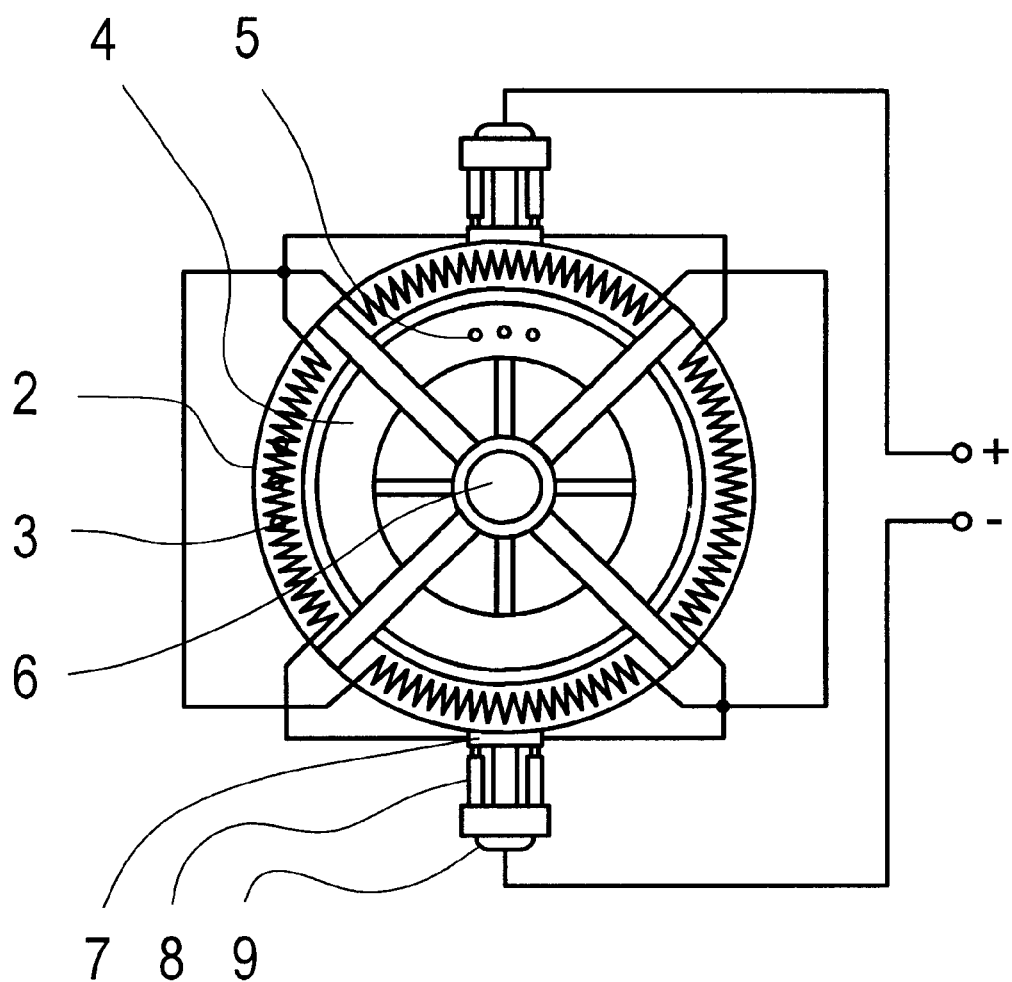
Figure 3:
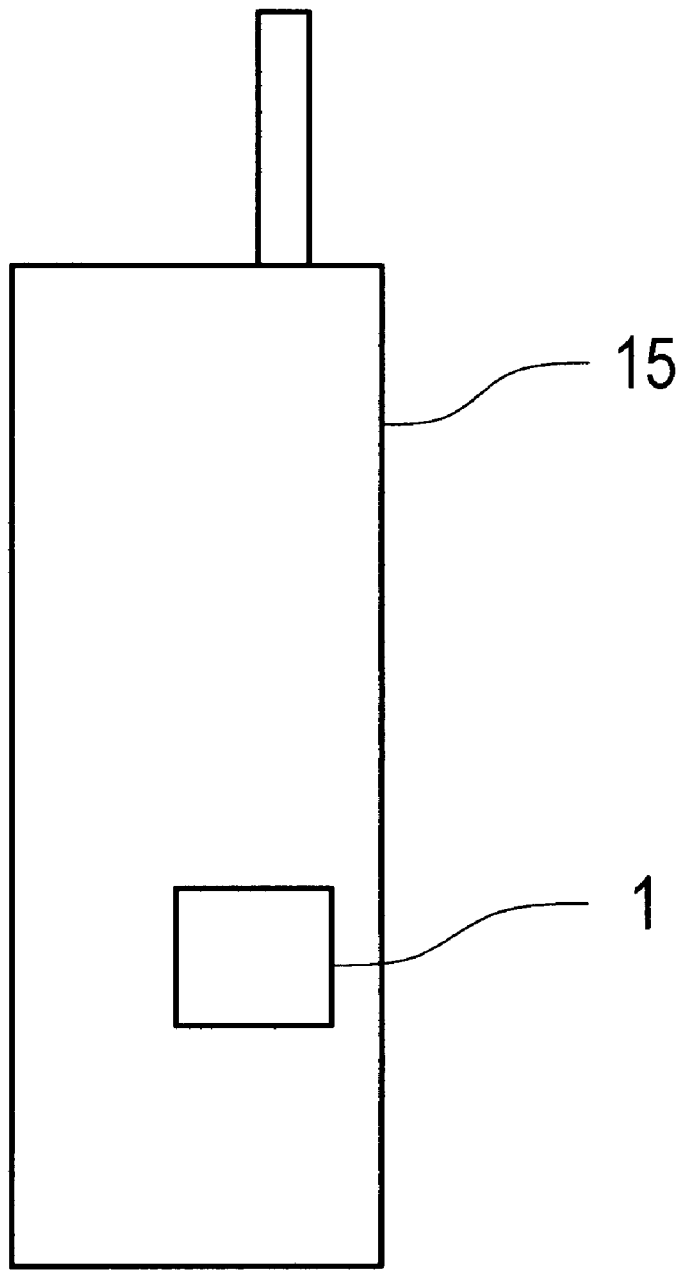
FIG. 3 is a schematical representation of a portable communications device incorporating the electromechanical transducer.

According to the inventive concept of the present invention the operability of a portable communication device, such as a mobile telephone, 15 is enhanced by providing it with electromechanical transducer means, which is actuated by movements of the device and converts mechanical energy thus generated into electrical energy for supplying power to the device, wherein the electromechanical transducer means is arranged to store mechanical energy also after a respective movement of the device has ceased. In this way the electromechanical transducer means is able to supply electrical power to the device for considerable time periods between subsequent movements of the device. According to a preferred embodiment of the invention the above is achieved by an electromechanical transducer means in the form of a mechanical flywheel shown in FIGS. 1 and 2. The operating principle of the embodiment shown in FIGS. 1 and 2 is that of a DC (direct current) generator. The direct current device is suspended inside a metallic ball 1 and is arranged to generate a voltage when moved. The device is pivotably mounted about a first axis 6 and a second axis 9 and is therefore rotatable in the horizontal direction, as indicated by 12, and in the vertical direction, as indicated by 11, respectively. The device comprises a stator 2 and a rotor 4, each of which is provided with weights 3 and 5, respectively, for causing unbalance, so that voltage may be generated as described below.

The horizontal axis 9 is provided, on either sides of the rotor/stator portion, with carbon 8 and a slip-ring 7, which are connected to a positive and a negative terminal, respectively. Furthermore, the device is supported by a base plate 10.

The direct current device is arranged to be located in a portable communication device, such as a mobile telephone. A portable communication device is subjected to various kinds of movements, e.g. when being held by the hand of a human user, when being carried in a waist belt or when being stored in a pocket or bag. Every time the portable communication device is subjected to a movement, the direct current device shown in FIGS. 1 and 2 will be rotated in a vertical direction 11 (the entire rotor/stator portion) and in a horizontal direction 12 (the rotor 4). The voltage generated in the windings of the stator 2, when the rotor 4 moves in relation to the stator 2, are supplied at the positive and negative terminals. Furthermore, thanks to the unbalance caused by the weights 3 and 5 the direct current device will be kept in motion not only during a respective movement of the portable device but also during a period of time following the moment when the movement of the portable communication device ends. Hence, the flywheel device of FIGS. 1 and 2 is in itself a storage medium for energy and acts as an electromechanical battery, which stores mechanical energy by maintaining the rotation of the stator/rotor even if the external excitation (due to movement of the portable communication device) stops. The mechanical energy stored in the flywheel device may be used whenever needed in the form of an output voltage across the positive and negative terminals.

The flywheel device of FIGS. 1 and 2 is preferably connected to at least one rechargable electrochemical battery cell (such as a NiMH or Li cell) in a battery pack arranged to be attached to the portable communication device. In such a case the flywheel device assists in supplying charging current to the electrochemical battery cell(s), thereby preventing the battery pack from becoming completely discharged, on condition that the portable communication device is subjected to a movement every now and then. The flywheel device may also be connected to the electronic circuitry of the portable communication device, thereby acting as an auxiliary power supply to be used in emergency situations, when the main battery pack is inoperative, by simply subjecting the portable communication device to movements during a short period of time. Depending on the actual application the flywheel device may be located either inside the main apparatus housing of the portable communication device or inside the battery pack housing.

Alternatively, the flywheel device may be connected to an electric component capable of storing electrical charge, such as a capacitor. The flywheel device will then charge the capacitor by converting the mechanical energy caused by moving the portable communication device to electrical energy. The electrical energy stored in the capacitor may in turn be used for supplying power to the electronic circuitry of the portable communication device or for charging an electrochemical battery pack.

The invention has been described above by way of a preferred embodiment. However, the disclosure has exemplifying but not limiting purposes, and the scope of the invention is only limited by the definitions in the appended independent patent claims.

What is claimed is:

1. A portable communication device, comprising an electromechanical transducer adapted to convert mechanical energy, caused by movements of the portable communication device, into electrical energy for supplying power to the portable communication device, wherein said electromechanical transducer is arranged to store mechanical energy after a respective movement of the portable communication device ceases, wherein said electromechanical transducer comprises a stator and a rotor, and wherein the rotor is rotatable with respect to the stator about a first axis, and the stator together with the rotor are rotatable about a second axis, said second axis being substantially perpendicular to said first axis.

2. A portable communication device according to claim 1, wherein at least one of the stator and the rotor is provided with at least one weight for causing an unbalance of the stator and/or rotor with respect to said first and/or second axis.

3. A portable communication device according to claim 1, wherein the electromechanical transducer means is connected to at least one rechargable battery cell for supplying charging current to the latter.

4. A portable communication device according to claim 1, wherein the electromechanical transducer is connected to a capacitor.

5. A portable communication device according to claim 1, wherein the device is a radio telephone.

6. A battery pack for a portable communication device, comprising an electromechanical transducer adapted to convert mechanical energy, caused by movements of the portable communication device, into electrical energy for supplying power to the portable communication device, the electromechanical transducer being arranged to store mechanical energy after a respective movement of the portable communication device ceases and comprising a stator and a rotor, wherein the rotor is rotatable with respect to the stator about a first axis, while the stator together with the rotor are rotatable about a second axis, which is substantially perpendicular to the first axis.

7. A battery pack according to claim 6, further comprising at least one rechargable battery cell.

8. A battery pack according to claim 7, further comprising a capacitor connected to the electromechanical transducer.

* * * * *